Dec. 25, 1962 W. B. ELAM 3,070,274
CONTAINER SIDE SEAM
Filed Dec. 30, 1958 2 Sheets-Sheet 1
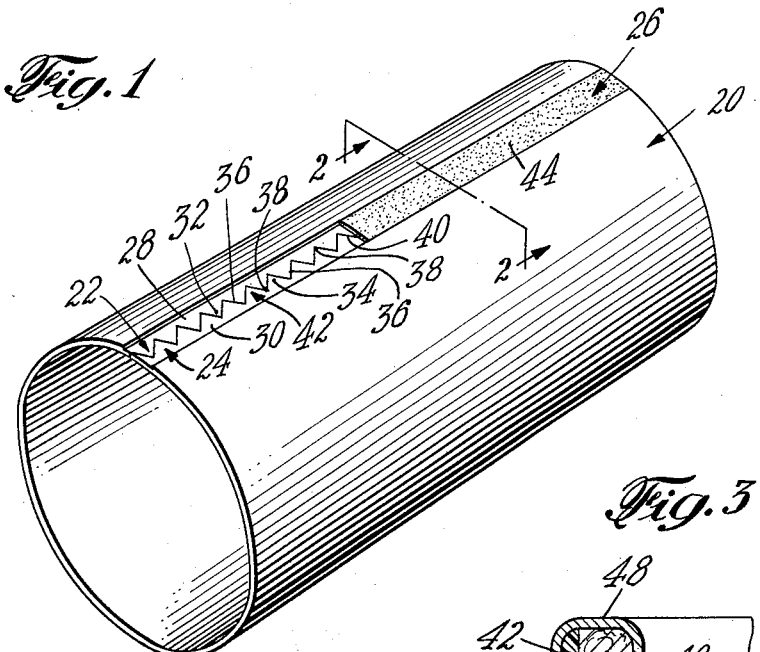
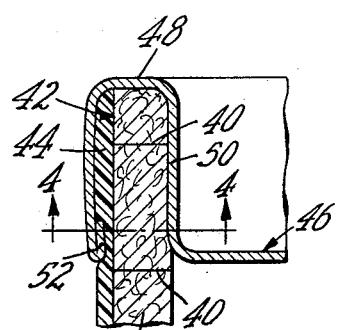
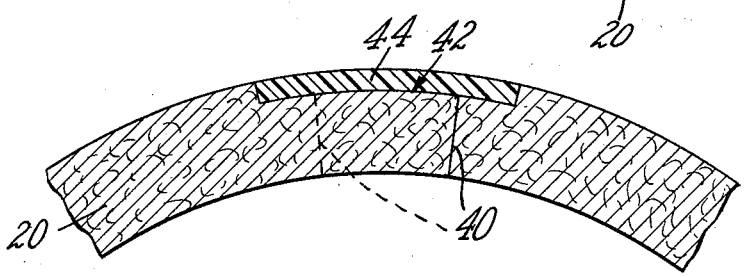
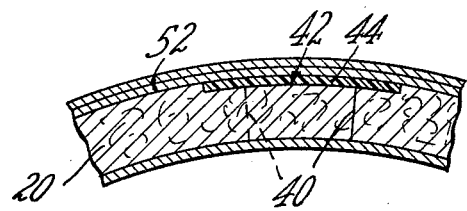
INVENTOR.
WILLIAM B. ELAM
BY George P. Ziehmer Jr.
AGENT Dec. 25, 1962  W. B. ELAM  3,070,274
CONTAINER SIDE SEAM
Filed Dec. 30, 1958  2 Sheets-Sheet 2
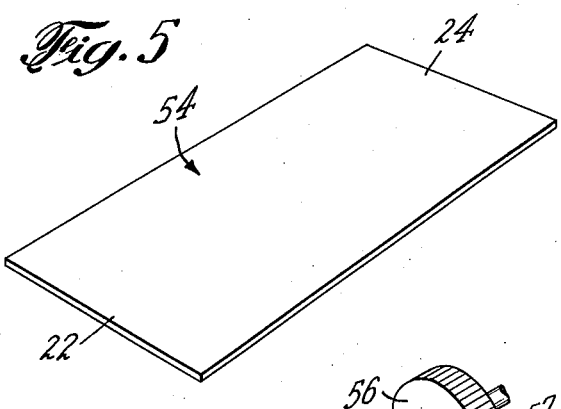
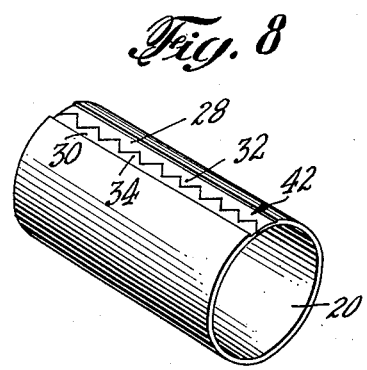
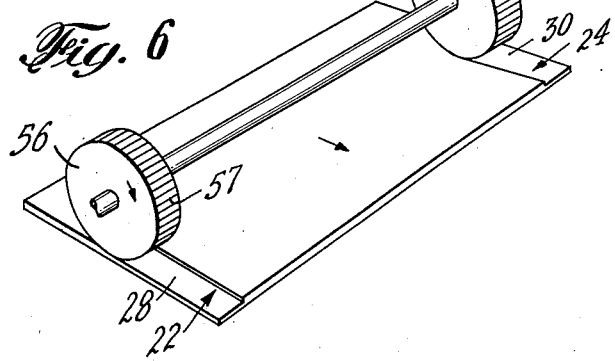
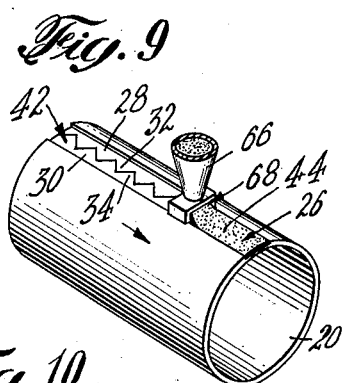
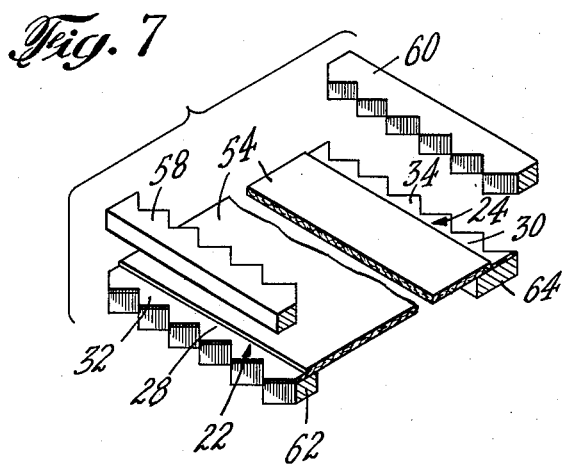
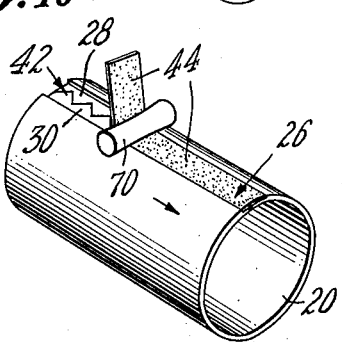
INVENTOR.
WILLIAM B. ELAM
BY
AGENT

United States Patent Office 3,070,274
Patented Dec. 25, 1962

3,070,274
CONTAINER SIDE SEAM
William B. Elam, Jersey City, N.J., assignor to American Can Company, New York, N.Y., a corporation of New Jersey
Filed Dec. 30, 1958, Ser. No. 783,772
1 Claim. (Cl. 229—4.5)

The present invention relates to containers, and has particular reference to a single thickness side seam especially adapted for use for with fibre bodies.

One of the basic container types now in use is the so-called "composite" container which comprises a fibre body having its opposite ends closed by means of suitable metal end members. One form of such fibre body comprises a long, comparatively thin strip of body stock convolutely wound upon itself to form a multi-ply body. In another form, a single thickness body is formed of a blank having its longitudinal peripheral edge portions overlapped and glued together to form a side seam. In both types, steps are created by the inner and outer longitudinal edges of the body blank, which steps are frequently objectionable in that they hamper the formation of tight end seals.

The present invention provides a side seam for fibre containers wherein the edges of the blank are engaged in abutting relationship. As a result, the objectionable steps heretofore referred to are completely eliminated, and the body is everywhere of a thickness no greater than that of the stock from which it is made. In order to hold the abutted edges permanently in position and to provide the requisite bonding of the side seam, external portions of the body adjacent both abutting edges are milled out to form steps which cooperate to form a groove, and a bonding strip of a strong plastic material is placed in the groove to bridge the abutted edges and to restore the thickness of the grooved area to that of the body stock. This plastic strip, which may either be extruded directly into the groove or may take the form of a length of plastic tape, adheres tenaciously to the body stock, and in effect creates a lap type seam which is highly resistant to shearing stresses. Since pressure exerted on the inside of the container by its contents exerts a shearing stress at the side seam, the resistance of the side seam of the instant invention against opening is very great, approaching the pressures necessary to tear the tough plastic strip.

The formation of the side seam of the instant invention is facilitated by the fact that the abutted longitudinal edge portions of the body are formed with offset, interfitting or interdigitating serrations that have a self-centering action in aligning the blank edges during formation of the seam. These serrations also function to reduce or eliminate undesirable "peaking" of the body. Peaking, in can making parlance, is the tendency of a cylindrical body to assume an angular or pointed cross-sectional configuration at the side seam.

An object of the invention, therefore is the provision of a single thickness side seam which presents smooth interior and exterior surfaces which facilitate the formation of tight end seams.

Another object is the provision of such a seam which is resistant to the shearing stresses ordinarily encountered in container bodies, and which also exhibits a marked resistance to peaking.

Still another object is the provision of a single thickness side seam which effects economy of body blank material, since the usual overlap of the body blank edges is eliminated.

Yet another object is the provision of a side seam which is provided with self-aligning abutting edges.

Another object is to provide a simple method of forming a side seam embodying the foregoing advantages.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a fibrous container body having a side seam embodying the principles of the present invention, a portion of the plastic bonding strip being broken away to show the underlying portions of the side seam;

FIG. 2 is an enlarged sectional detail taken substantially along the line 2—2 in FIG. 1, parts being broken away;

FIG. 3 is an enlarged longitudinal sectional detail taken centrally through a side seam embodying the principles of the instant invention, the view being taken through one end of a completed container and showing a metal end closure crimped in place on the body;

FIG. 4 is a view taken substantially along the line 4—4 in FIG. 3, parts being broken away;

FIGS. 5 through 9 are successive views illustrating the various method steps utilized in forming the side seam of the instant invention, and FIG. 10 is a view corresponding to FIG. 9, and showing an alternative method step utilized to provide the plastic bonding strip.

As a preferred and exemplary embodiment of the instant invention, the drawings illustrate a tubular container body 20 having its opposed longitudinal edge portions 22, 24 secured in a side seam, generally designated by the numeral 26, made in accordance with the principles of the instant invention.

As best seen in FIG. 1, externally recessed steps 28, 30 are provided in the respective edge portions 22, 24, and these edge portions 22, 24 are further respectively provided with uniform serrations 32, 34 which are of regular saw-tooth construction, being formed with equi-angularly tapered edges 36 which converge at apexes 38. The serrations 32 of the edge portion 22 are offset relative to the serratins 34 of the edge portion 24 a distance equal to one-half the base width of a serration. As a result, when the edge portions 22, 24 are abutted against each other, the opposing serrations 32, 34 interlock or interdigitate to create a closely abutted face-to-face joint 40. Because of the tapered construction of the serrations, they provide a self-centering or self-aligning action which greatly facilitates end-to-end alignment of the edge portions 22, 24. The drawings show the preferred construction wherein the serrations extend for the full length of the edge portions. However, it is obvious that the objects of the invention can under some circumstances be attained if the serrations extend only for a portion of the length of the side seam.

With the edge portions thus aligned and abutted, the steps 28, 30 cooperate to form a continuous rectangular groove 42 which extends for the complete length of the body 20. The groove 42 serves as a seat for a plastic bonding strip 44 which bridges the abutted joint 40 and adheres to the fibrous stock of the groove to thus bond the edge portions 22, 24 and complete the side seam 26. The plastic strip 44 has width and a thickness which are substantially equal to the width and depth of the groove 42, and thus completely fills the groove 42 and conforms to its shape, thus restoring the body in the side seam area to the thickness of the body stock. The plastic strip 44 may either be extruded as a flat ribbon directly into the groove 42 or may comprise a piece of preformed tape which is mechanically inserted in the groove.

In the former instance, the strip 44 may be formed of any suitable thermoplastic material, such as polyethylene, which can be heat softened to extruding consistency.

Since this plastic is applied in a molten or semi-molten state, it comes into intimate contact with the body fibres in the walls of the grooves 42 and may even penetrate them to some extent. Thus, upon cooling, the plastic adheres tenaciously to the fibres of the body edge portions 22, 24, and holds these portions securely in abutting relationship.

As stated, the strip 44 may also somprise a length of preformed plastic tape which is inserted into the groove 42. In such event, the inner surface of the tape which contacts the bottom wall of the groove 42 may be coated with a pressure sensitive adhesive in order to secure adherence to the fibre stock of the body. Tape of this type may be made from either a thermoplastic or thermosetting synthetic resin. As an alternative, the inner surface of the tape may be heated just before the tape is inserted in the groove 42 in order to reduce the inner portion of the tape to a semi-molten state so that it adheres securely to the body fibres. Here the tape must be formed of thermoplastic material.

It may in some instances be desirable that the strip 44 be made of a material other than a plastic resin. Satisfactory results may be had if the strip is made of fibre or even metal, and is pretreated to obtain the necessary adhesion.

FIGS. 3 and 4 show a conventional metal closure member 46 crimped into position onto an end of the body 20 in an end seam 48. The closure member 46 is formed with a peripheral U-shaped channel 50 which receives the body end, the free edge of the channel 50 being provided with an inward hem 52 which is embedded into the outer surface of the body 20, as best seen in FIG. 3, to clamp the closure member 46 onto the body. As seen in FIGS. 2 and 4, the side seam 26 of the instant invention is completely devoid of stepped edges and presents smooth inner and outer surfaces which closely engage the walls of the closure member channel 50 and thus facilitate the formation of an end seam 48 which is uniform in cross-section. This latter condition is very desirable, since it enhances both the tightness and appearance of the end seam. It is obvious that other types of closures, including those made either of plastic or fibre material, and those which rely entirely on friction to hold them in place, may be used in conjunction with the body 20.

FIGURES 5 through 9 disclose the preferred method of forming a container body embodying the side seam 26 of the instant invention. As see in FIG. 5, the container is preferably formed from a flat blank 54 which is rectangular in shape and of uniform thickness.

As the first step of the instant method invention, the longitudinal edge portions 22, 24 of the blank 54 are passed beneath a pair of rotary milling cutters 56 formed with sharp cutting edges 57 which remove a portion of the surface material of the blank to form the steps 28, 30 (see FIG. 6).

The serrations 32, 34 are then cut in the stepped edge portions 22, 24 preferably by means of suitably serrated punches 58, 60 and matching dies 62, 64 (see FIG. 7). As previously explained, the serrations 32 are offset longitudinally with respect to the serrations 34 a distance equal to one-half the base length of a serration.

The blank 54 is next bent into tubular shape (see FIG. 8) to form the body 20, the blank being bent to position the steps 28, 30 on the external surface of the body so that they cooperate to form the external groove 42. Since the serrations 32, 34 are uniform in size and are offset from each other, they interlock in smoothly abutted relationship. Because of the tapered shape of these serrations 32, 34, they have a self-centering action which insures accurate end-to-end alignment of the opposed edges of the body 20.

While the opposed edge portions 22, 24 of the body 20 are thus held in abutting relationship, the groove 42 is filled with an adherent strip of plastic 44 to bond these edge portions together. This is preferably accomplished by passing the body 20 beneath an extruding nozzle 66 (see FIG. 9) formed with a rectangular orifice 68 which produces a ribbon having cross-sectional dimensions substantially the same as those of the groove 42. Since the extruded ribbon is in a soft, flowable condition, it readily conforms exactly to the slightly arcuate cross-section configuration of the groove, thereby completely filling the groove. The body 20 is held in tubular shape until the plastic cools and sets, after which it may be released. This completes the formation of the side seam 26.

As stated, the plastic strip 44 may, instead of being extruded, initially comprise a piece of preformed plastic tape having a length equal to that of the can body 20. FIG. 10 shows one way of applying such tape to the can body. Here the leading edge of the tape is aligned with the leading edge of the groove 42 and the body and tape are then passed beneath a pressure roll 70 having a concave surface which reversely corresponds in shape to the convex exterior contour of the body, and which presses the tape into the groove 42. As previously explained, the inner surface of the tape is pretreated to cause it to adhere to the body fibres, either by having a suitable adhesive preapplied thereto, or by being softened by the application of heat to convert it into a semi-molten, adherent condition.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirt and scope of the invention or sacrificing all of its material advantages, the form hereinbefore described being merely a preferred embodiment thereof.

I claim:

A single-ply cylindrical container body having a uniform wall thickness throughout, comprising
- a substantially rectangular fibrous sheet tubed into cylindrical form to bring opposed edges of said sheet into engagement,
- said opposed engaging edges having complementary saw-tooth configurations in interdigitating relationship forming a zigzag line of juncture extending longitudinally of said cylindrical body for preventing peaking of said body at said opposed edges thereby to maintain the cylindrical shape thereof,
- said body having an outwardly facing groove of uniform radial depth extending along said line of juncture and extending circumferentially beyond said zigzag line on each side thereof.
- and adherent bonding material completely filling said groove to permanently secure said sheet into cylindrical form, said bonding material having a thickness equal to the depth of said groove and providing a bonding strip of arcuate cross section having its outer surface conforming to the curvature of the cylindrical body thereby to maintain uniform wall thickness of said cylindrical tubular body.

References Cited in the file of this patent
UNITED STATES PATENTS

| | | |
|---|---|---|
| 1,164,153 | Woods | Dec. 14, 1915 |
| 1,417,776 | Shafer | May 30, 1922 |
| 1,958,455 | Ware | May 15, 1934 |
| 1,993,205 | Bowersock et al. | Mar. 5, 1935 |
| 2,027,747 | Morton | Jan. 14, 1936 |
| 2,177,627 | Drew | Oct. 31, 1939 |
| 2,314,523 | Speer | Mar. 23, 1943 |
| 2,367,725 | Lindh et al. | Jan. 23, 1945 |
| 2,392,734 | Haberstump | Jan. 8, 1946 |
| 2,537,509 | Camp | Jan. 9, 1951 |
| 2,733,181 | Riedesel | Jan. 31, 1956 |
| 2,899,347 | Kindseth | Aug. 11, 1959 |
| 2,960,425 | Sherman | Nov. 15, 1960 |